July 23, 1957  R. L. TWEEDALE ET AL  2,800,083
POWER TRANSMISSION
Filed Nov. 7, 1951  3 Sheets-Sheet 1

INVENTORS
RALPH L. TWEEDALE
ERNST F. KLESSIG
BY
ATTORNEY

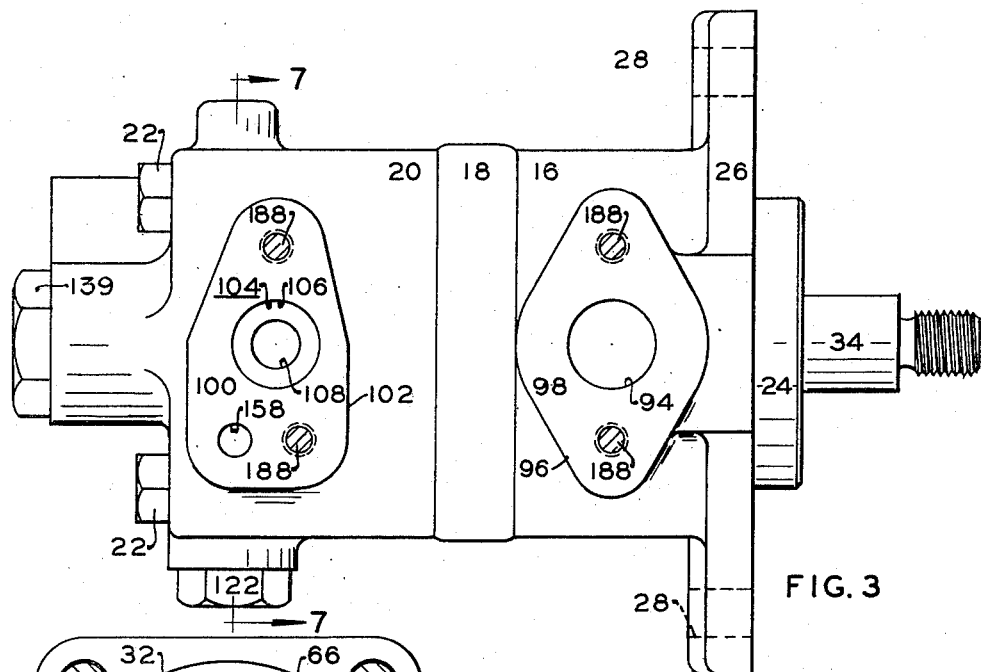
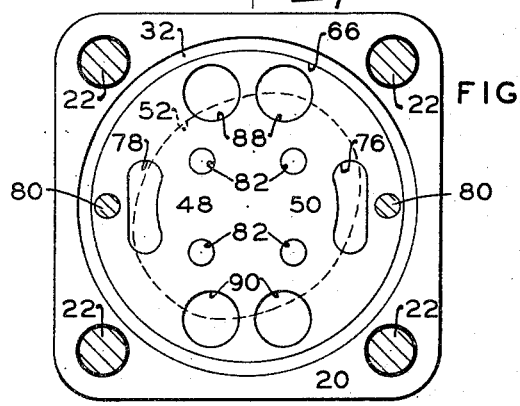
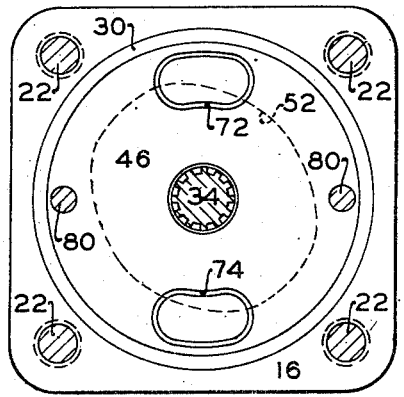
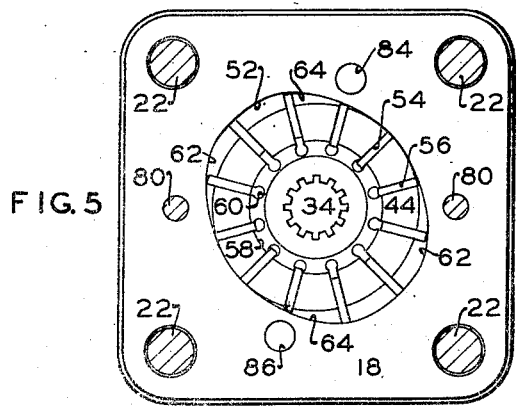

July 23, 1957 R. L. TWEEDALE ET AL 2,800,083
POWER TRANSMISSION
Filed Nov. 7, 1951 3 Sheets-Sheet 3

INVENTORS
RALPH L. TWEEDALE
ERNST F. KLESSIG
BY
*Ralph L. Tweedale*
ATTORNEY

United States Patent Office 2,800,083
Patented July 23, 1957

2,800,083
POWER TRANSMISSION

Ralph L. Tweedale, Birmingham, and Ernst F. Klessig, Berkley, Mich., assignors to Vickers Incorporated, Detroit, Mich., a corporation of Michigan Application November 7, 1951, Serial No. 255,250

13 Claims. (Cl. 103—42)

This invention relates to power transmissions, and is particularly applicable to those of the type comprising two or more fluid pressure energy translating devices, one of which may function as a pump and another as a fluid motor.

The invention relates generally to pumps and more particularly to the type of unit known as a "power pack" comprising a pump, a fluid reservoir, and usually a valve, or valves, integrated into a compact unit. These power pack units have had a wide acceptance in the automotive and agricultural fields due to their compactness and ease of installation. Simplicity and ruggedness of construction, low cost, long life, and efficient operation are of paramount importance in the design of such a unit. With the increasing emphasis being put on passenger car applications of hydraulic power, such as hydraulic steering boosters, hydraulic window lifts, etc., quietness of operation has become an additionally important criterion of such units.

When regarded as a prime mover for accessory drives, the engine of a motor vehicle leaves much to be desired since the operating speed may vary from perhaps 400 R. P. M. to 4000 R. P. M. and the output of, for example, a fixed displacement pump driven thereby will vary in the same ratio. The problem is not one to be solved by merely introducing gearing between the engine and the hydraulic pump since the 10:1 ratio between high and low speed still persists and, as in the case of a steering booster, output requirements of the pump may be as high, or higher, while the engine idles than while it is at top speed. Further, the control valve used in many steering boosters is an open center type in which machining tolerances are very closely controlled. For example, valve land widths may be held to axial thickness tolerances of the order of one-thousandth of an inch. Such painstaking and expensive construction is utilized to give the vehicle operator a nicety and preciseness of "feel" in steering which would be largely lost if the oil flow through the valve were allowed too much variance. A variable displacement pump is of course a possible solution to the problem but its cost and complexity often make it an unacceptable solution.

It is an object of the present invention to provide an improved low cost and compact hydraulic power unit which is exceptionally well adapted for use with a variable speed prime mover such as the engine of a motor vehicle.

More particularly, it is an object to provide such a unit, utilizing a fixed displacement pump, in which the output to the driven device is maintained at a relatively constant rate regardless of speed variations of the prime mover.

A further major problem encountered in automotive applications is the phenomenon known in the art as cavitation, which normally occurs at high pump speeds. It is well known in the art that cavitation and its attendant noise and wear can be eliminated by maintaining sufficient pressure on the pump inlet to prevent the creation of voids in the working fluid. For relatively low speed operation it may be sufficient to merely place the pump inlet in fluid communication with a reservoir which is at, or even below, the level of the pump inlet, and atmospheric pressure on the fluid in the tank will suffice to maintain the pump inlet full of oil thus preventing cavitation. Fluid returning from the motor will be directed into the reservoir from which the pump is supplied. This type of circuit is known as an open circuit and has many inherent advantages among which are automatic replenishment of leakage losses, continual exchange of the working fluid for cool, clean deaerated fluid from the reservoir, and easy and complete initial filling of the system by merely putting fluid into the reservoir.

However, as the pump speed increases cavitation may result due to the inadequacy of atmospheric pressure for keeping the pump inlet passages full. Elevation of the reservoir to a height sufficient to increase the liquid head enough to prevent cavitation is, of course, one solution, but in most cases is impractical and in many cases is impossible. A modification of the open circuit by the insertion of a second pump, which may be called a supercharge pump, in the line between the reservoir and the working pump inlet to provide sufficient pressure on the working pump inlet is another solution of the problem and permits retention of the advantages of the open circuit. This arrangement has the very substantial disadvantage of requiring an additional pump of a capacity which must exceed that of the working pump.

To avoid the disadvantage of the large supercharge pump required for use with an open circuit, the system known as a closed circuit is in wide use. The distinguishing characteristic of the closed circuit is that substantially all the fluid delivered by the working pump to the motor returns directly to the pump inlet without passing through the reservoir. A typical closed circuit includes a working pump and a motor having two lines therebetween, one for delivery and one for return, a reservoir, and a supercharge pump having its inlet connected to the reservoir and its outlet connected into the return line between the working pump and the motor. The supercharge pump maintains an adequate pressure on the working pump inlet to prevent cavitation. The advantage of this system is that a smaller supercharge pump is required than is necessary in the modified open system. Disadvantages of the closed system include the requirement of a second pump, however small, and that the fluid returning to the working pump from the motor does not receive the benefits derived from a period of relative quiescence in the reservoir as in the open circuit.

Another method of producing a pressure on the pump inlet sufficient to prevent cavitation has been the application of Bernoulli's principle wherein the kinetic energy possessed by rapidly moving oil is converted in part to a static head on the pump inlet passages. This has been accomplished in the past by inserting a venturi in the return line between the pump and the motor in a closed circuit. The advantage of this method of producing pressure is that no second pump is required. Such a device may be seen in the patent to Davis 2,251,664.

It can be seen from the foregoing that a system which would provide the advantages of open circuit operation at speeds below that at which cavitation occurs and which, as the pump speed increases beyond that point, will increase the pressure on the pump inlet so as to prevent cavitation is highly desirable. The above-mentioned patent to Davis shows such a system but employs sliding valve means, responsive to flow in the return line, used solely for the purpose of providing open circuit operation at low speed and an automatic change to closed circuit operation, thus increasing the pump inlet pressure, at high speed.

It is an object of the present invention to provide a system which, while retaining the desirable characteristics of open circuit operation at low speeds, will automatically operate as a closed circuit as the pump speed approaches the point where cavitation occurs, and increase the pressure on the pump inlet zone so as to eliminate cavitation. Further, it is an object to accomplish this change in circuit operation without the use of any special valve or moving part or auxiliary pump.

Other problems encountered in such applications are the necessity for replenishing to compensate for leakage losses, removal of air entrained in the operating fluid and cooling the fluid in the system.

Another object is to provide such a unit in which leakage losses are continually made up from the reservoir and in which, during closed circuit operation, a portion of the working fluid is bled into the reservoir and replaced by fresh, cool, clean, and deaerated fluid from the reservoir.

A still further object is to provide such a unit at a low cost but without sacrifice of operating efficiency. This has been accomplished by utilizing basic pumping structure well known in the art in the novel combination described herein.

Further objects and advantages of the present invention will be apparent from the following description, reference being had to the accompanying drawings wherein a preferred form of the present invention is clearly shown.

Figures 1, 2:
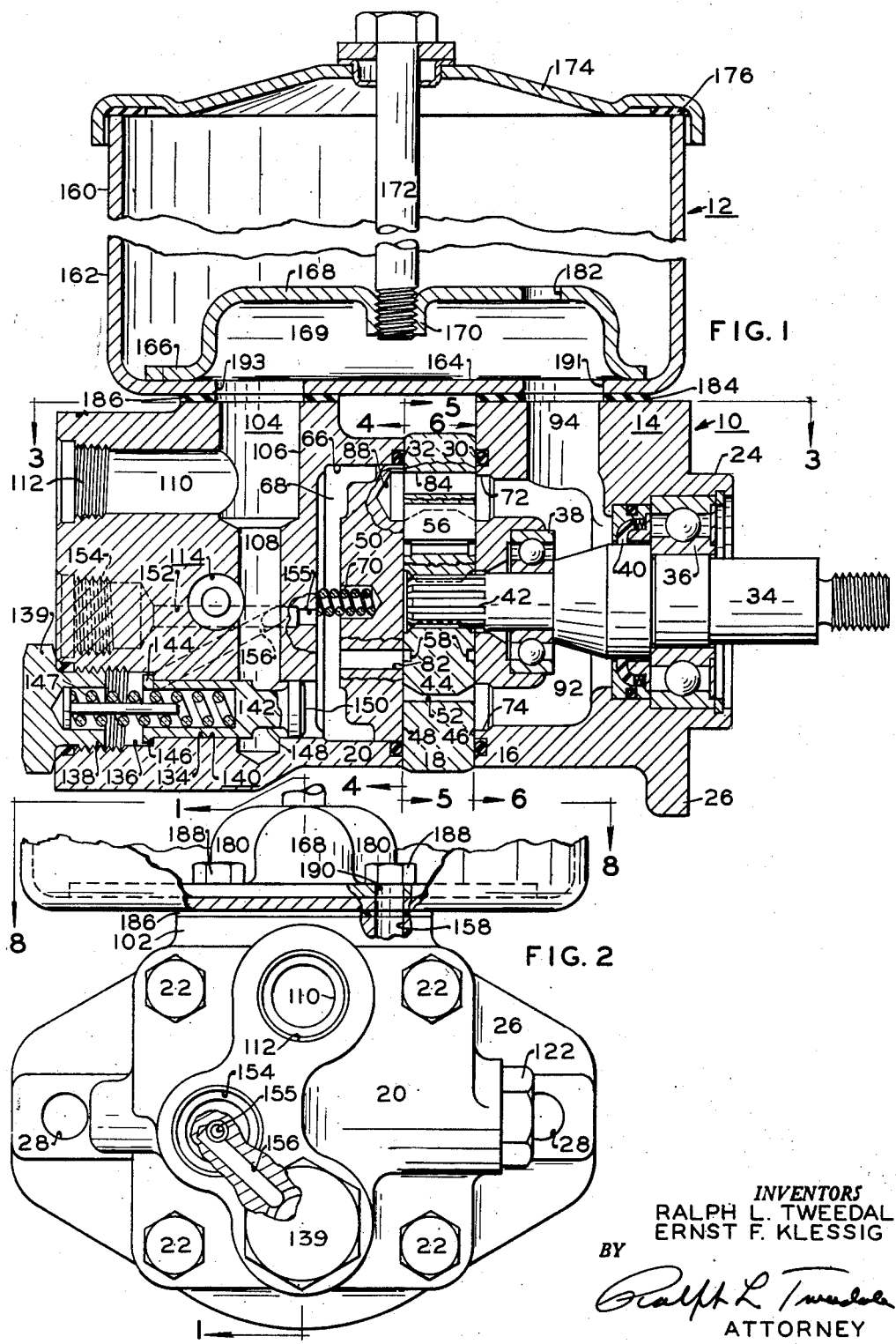
Figure 1 is a sectional view of a preferred form of the present invention taken on line 1—1 of Figure 2.
Figure 2 is an end elevation, partially in section, of the unit shown in Figure 1.
Figure 7:
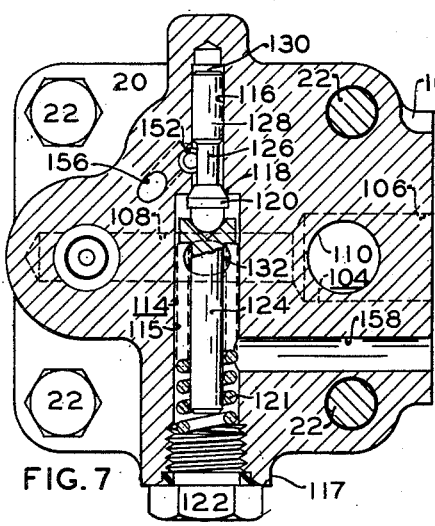
Figure 8:
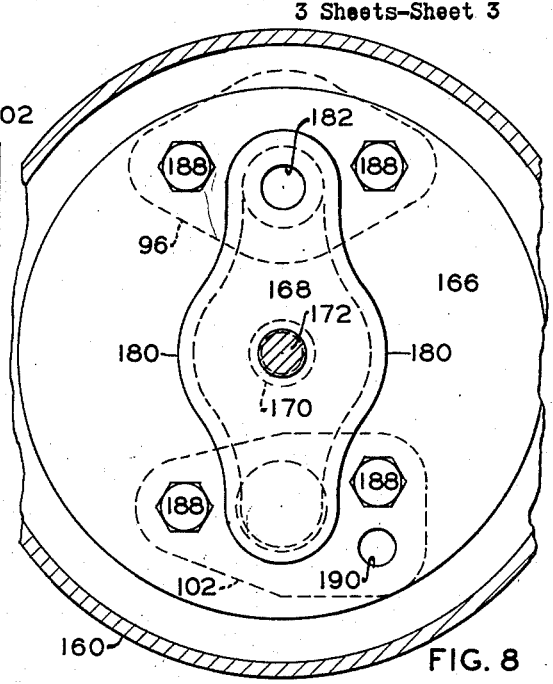
Figure 9:
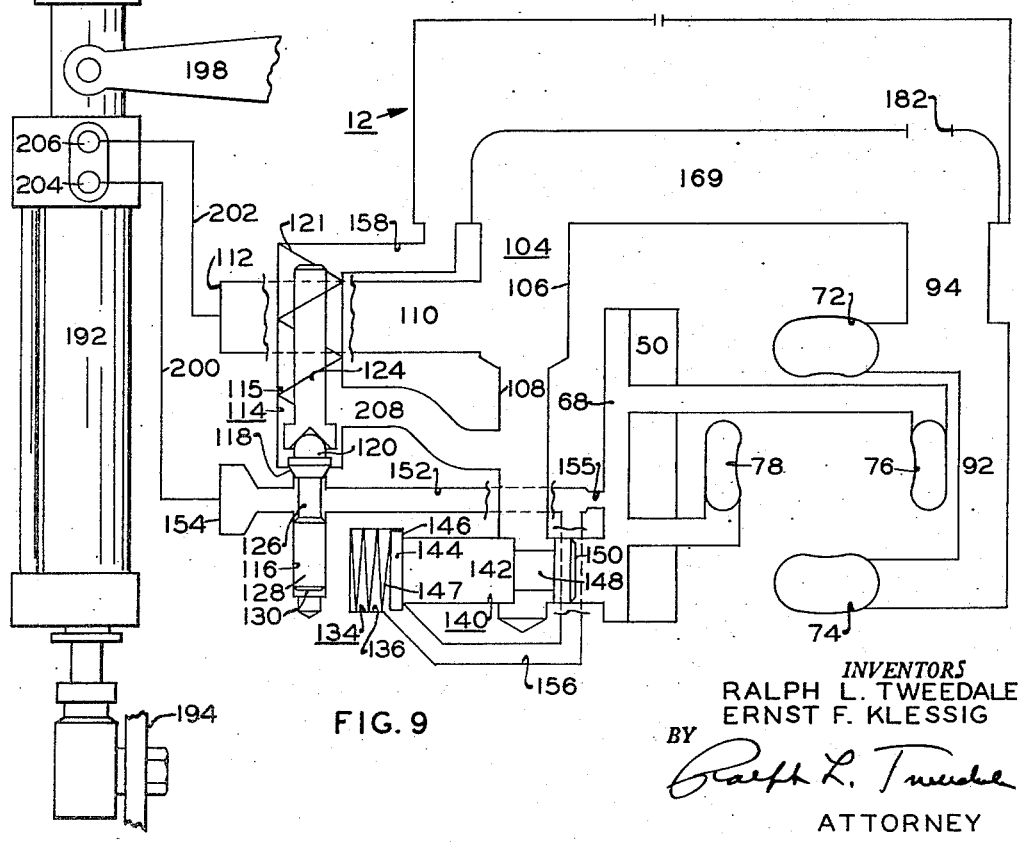

Figure 3 is a section on line 3—3 of Figure 1.
Figure 4 is a section on line 4—4 of Figure 1.
Figure 5 is a section on line 5—5 of Figure 1.
Figure 6 is a section on line 6—6 of Figure 1.
Figure 7 is a section on line 7—7 of Figure 3.
Figure 8 is a section on line 8—8 of Figure 2.
Figure 9 is a schematic diagram of the unit, shown in a typical application.

Referring to Figure 1, there is shown a pump generally designated 10 and a tank generally designated 12. The pump 10 is of the well-known radially sliding vane type and includes a housing 14 composed of three sections arranged in a sandwich relation. These three elements and a body portion 16, a ring portion 18, and a head portion 20 secured together by the use of bolts 22 extending through the head and ring portions and engaging screw threads in the body portion 16. Body portion 16 includes a pilot 24 and a mounting flange 26 having mounting holes 28 therein. O-ring seals 30 and 32 insure a fluid tight juncture of the housing portions 16 and 20 with ring portion 18.

A drive shaft 34 extends from the body portion 16 and is supported therein by bearings 36 and 38. A shaft seal 40 encircles the shaft 34 in the usual manner. The inner end of the shaft 34 carries a spline at 42 which engages the rotor 44 of the pumping mechanism. Rotor 44 is mounted between parallel plane surfaces comprising the face 46 of the body portion 16 and the face 48 of a floatably mounted pressure plate 50. Rotor 44 is encircled by a generally elliptical cam contour 52 machined in the ring portion 18. Radial slots 54 in rotor 44 contain radially slidable vanes 56. The outward ends of vanes 56 are maintained against the cam contour 52 by centrifugal force aided by fluid pressure in channels 58 of the rotor 44 which communicate with enlarged portions 60 of the inner ends of the vane slots 54. Rotor 44, vanes 56, cam contour 52 and surfaces 46 and 48 define pairs of diametrically opposed high pressure, or pumping, zones 62 and low pressure, or suction, zones 64.

Pressure plate 50 is mounted in a bore 66 in the head portion 20 of the housing 14 and coacts therewith to form a pressure chamber 68. A spring 70 resiliently biases pressure plate 50 into fluid sealing engagement with rotor 44. The requisite porting to the inlet zones 64 is supplied by a pair of kidney shaped ports 72 and 74 in the face 46 of the body portion 16. Porting from the pumping zones 62 is supplied by a pair of kidney-shaped ports 76 and 78 extending completely through the pressure plate 50 into the pressure chamber 68. Body portion 16, ring portion 18, and pressure plate 50 are maintained in the proper angular relation by dowel pins 80 extending from body portion 16 through ring portion 18 and into pressure plate 50. It is apparent that the working pressure of the pump will exist in pressure chamber 68 and be exerted on pressure plate 50 so as to aid the spring 70 with a force proportional to the pump working pressure.

The manner in which kidney-shaped ports 72 and 74 overlie suction zones 64 and kidney ports 76 and 78 overlie pumping zones 62 can best be seen by reference to Figures 4 and 6. The dotted outline of cam contour 52 indicates the actual positional relation between the cam ring and the kidney ports. A number of drilled holes 82 in the pressure plate 50 provide fluid communication between pressure chamber 68 and the channels 58 in the rotor 44 for the purpose previously mentioned. A pair of crossover passages 84 and 86 in ring section 18 afford communication between the kidney ports 72 and 74, respectively, and one of each of two pairs of blind holes 88 and 90 in the pressure plate 50. This arrangement permits the suction zones 64 to receive fluid from both sides of the rotor, thus producing a more satisfactory inlet condition.

Kidney ports 72 and 74 are at the termni of a branched passage 92, in the housing portion 16, which is in fluid communication with a passage 94 leading to the exterior of body portion 16 and emerging therefrom in a flange 96. The face 98 of flange 96 is coplaner with the face 100 of a similar flange 102 on the head portion 20 of housing 14. A stepped bore 104 extends from flange 102 to the interior of head portion 20 and includes an enlarged portion 106 and a relatively constricted portion 108.

Bore 104 is intersected by three other bores in head portion 20. The first of these, bore 110, extends from the enlarged portion 106 of bore 104 to the exterior of the head portion 20 of the housing 14 and is equipped at its outer end with a threaded connection port 112.

The second of these intersecting bores, designated 114, breaks into the bore 104 in its constricted portion 108. Bore 114 extends transversely into head portion 20 from a boss 117. This can best be seen by reference to Figure 7. Bore 114 includes a spring chamber 115 and a relatively reduced portion 116. A valve seat 118 is formed at the juncture of the smaller and larger portions of the bore. A relief valve 120 is inserted in the bore and is resiliently biased against the valve seat 118 by a spring 121. Spring 121 is retained in the bore by means of a fluid sealing plug 122 which closes the outer end of bore 114. Spring guide 124 serves to limit the travel of valve 120 away from the seat 118 by making contact with the plug 122. Contact with seat 118 of course determines the normal position of the valve 120. Valve 120 extends inward considerably beyond seat 118 and the extension includes a necked down portion 126 and a pilot portion 128. Pilot portion 128 serves the dual function of maintaining the valve in alignment with the seat and providing a dashpot action. The dashpot action is obtained by maintaining a relatively close fit between the pilot portion 128 of the valve 120 and the reduced portion 116 of the bore 114, thus providing a restricted path to or from the presure effective area 130 at the end of valve 120. The intersection of bore 114 and bore 104 is indicated at 132 and it can thus be seen that spring chamber 115 of bore 114 is in communication with the restricted portion 108 of passage 104.

A stepped bore 134 is the last of the three bores intersecting bore 104 and includes an enlarged portion 136 extending to the exterior of head portion 20, and having screw threads 138 therein, and a reduced portion 140 intersecting bore 104 in its constricted portion and extending to the pressure chamber 68. Bore 134 is closed by a fluid sealing plug 139 which engages the threads 138.

Bore 134 contains a valve 142 having a shoulder 144 adapted to engage the shoulder 146 formed at the step between the enlarged portion 136 and the reduced portion 140. A spring 147 resiliently biases the valve 142 to a normal position determined by the engagement of these two shoulders. In this normal position valve 142 extends in slidable fluid sealing engagement into the reduced portion 140 of bore 134 to a point past the intersection with bore 104. Pressure chamber 68 is thus isolated from bore 104 when valve 142 is in its normal position. It can be seen that when valve 142 shifts to the left, communication is effected between pressure chamber 68 and bore 104 and to aid flow therebetween, valve 142 is provided with a necked-down portion 148. It is also apparent that whatever pressure exists in pressure chamber 68 will also be exerted against the nose 150 of valve 142. A dashpot action is provided for the valve 142 by maintaining a relatively close fit between the periphery of shoulder 144 and bore 136.

A stepped delivery passage 152 extends from the pressure chamber 68 to the exterior of the head portion 20 terminating in a threaded connection port 154. At the point of exit from pressure chamber 68 passage 152 includes a short portion of a reduced cross-section to provide an orifice or throat 155 whose diameter can be held to close tolerances if desired. The orifice 155 serves as a metering device by which variations in delivery rate may be sensed and compensated for by automatic valve means hereafter described. Delivery passage 152 intersects bore 114 containing relief valve 120 as can best be seen in Figure 7. Fluid pressure in passage 152 is thus exerted on the pressure effective area 130 of the relief valve 120 as previously described.

An obliquely drilled passage 156 in the head portion 20 extends from the enlarged portion 136 of the bore 134 to intersect passage 152 as can be seen by reference to Figures 1, 2, and 7. Passage 156 intersects passage 152 between the orifice 155 and the intersection of passage 152 with relief valve bore 114. It is therefore apparent valve 142 is subjected to two opposing pressure forces in addition to the force exerted by the spring 147. The first of these pressure forces is that due to the pressure existing in pressure chamber 68 exerted on the nose 150 of the valve 142. The second of these pressure forces is that existing in the passage 152, downstream from the orifice 155, which is communicated through the drilled passage 156 to act on the opposite end of valve 142. As flow in passage 152 increases, a point will be reached where the pressure drop across orifice 155 is sufficiently great to permit the pressure force acting on the nose 150 of the valve 142 to shift the valve against the force of spring 147 and the pressure force aiding the spring. The resulting shift of valve 142 establishes communication between the pressure chamber 68 and the bore 104. As the pump delivery volume increases beyond such point the valve 142 will open wider thus bypassing the excess delivery. At all speeds above the cracking point for valve 142 the valve will tend to maintain the pressure drop through orifice 155 constant and thus maintain the flow rate therethrough constant.

Head portion 20 also includes a passage 158 extending from the flange 102 to the spring chamber of the relief valve 120.

Tank 12 includes a can-like body portion 160 having cylindrical walls 162 and a flat bottom 164. Overlying the tank bottom 164 is a floor plate 166 which may, if desired, be secured to the tank bottom by any suitable means such as spot welding. Floor plate 166 is a generally disc shaped member, as can best be seen from Figure 8, having a peripheral diameter which is somewhat smaller than the flat bottom portion 164 of the tank. Floor plate 166 is formed with a raised central portion 168 so as to form, with the tank bottom 164, a fluid channel 169. An inwardly flanged hole at 170 in the raised portion 168 is threaded to receive a bolt 172 used to secure the tank cover 174 in place. A gasket 176 insures a fluid tank joint between the cover 174 and the body 160. Tank 12 is vented to atmospheric pressure by leakage of air around the opening in the cover 174 through which the bolt 172 extends. Any constrictive effect of the flange at 170 on fluid flow in channel 169 is avoided by the flaring of the raised portion 168 at 180. The raised portion 168 of floor plate 166 also contains a bleed hole 182 extending from the channel 169 to the interior of the tank 12. Bore 110, the enlarged portion 106 of bore 104, channel 169, and passage 94 thus comprise, with respect to housing 14, a reentrant return passage.

Tank 12 is mounted on the pump housing 14 by attachment to flanges 102 and 96. Suitable gaskets 184 and 186 are provided between the flange surfaces 98 and 100 and the tank bottom 164. Bolts 188 are provided which extend through the floor plate 166, tank bottom 164, gaskets 184 and 186 and into tapped holes in the flanges 96 and 102. Floor plate 166 and tank bottom 164 are thus additionally secured together and the entire tank unit is secured to the pump body 14. An additional hole 190 through both the floor plate 166 and the tank bottom 164 is so positioned as to be aligned with the passage 158 in the body portion 20, and a matching hole in the gasket 186, so as to provide fluid communication between the interior of tank 12 and passage 158.

Two holes 191 and 193 through the tank bottom 164 and matching holes through the gaskets 184 and 186 effect communication between passage 94 and bore 104, in the housing 14, and channel 169.

Operation of the unit can best be understood by reference to Figure 9, which is a schematic arrangement of the unit's components and passages and in which a typical application is shown. In the application shown, a steering booster 192, which may be of the type described in the patent to Vickers 2,022,698, is fixed to the frame of the motor vehicle at 194, connected to the steering linkage by a rod 196 and controlled by a pitman arm 198. A fluid delivery line 200 connects the pump outlet port 154 to the booster inlet port 204 while a fluid return line 202 connects the booster outlet port 206 to the return port 112. In operation, shaft 34 is driven by the engine of the vehicle by any suitable means. Fluid is taken into the suction zones 64 from the inlet kidney ports 72 and 74 and is discharged from the pumping zones 62 into the kidney ports 76 and 78 in a manner well known in the art. Pressure fluid discharged into kidney ports 76 and 78 passes through pressure plate 50 and into pressure chamber 68. During relatively low speed operation of the pump, fluid will pass from pressure chamber 68 to the delivery passage 152 at a rate equal to the discharge rate of the pumping mechanism. This fluid will then pass through the conduit 200 to the inlet port 204 of the steering booster 192. Return fluid from the booster 192 will pass out port 206 and return through conduit 202 to the passage 110 in the pump body 14. From passage 110, the returning fluid will enter the enlarged portion 106 of the bore 104 passing from there into the channel 169, thence to the passage 94 in the body portion 16 and return through the branched passage 92 to the inlet kidney ports 72 and 74.

However, due to unavoidable leakage and also the fact that booster unit 192 is of the differential piston type thus taking in more fluid, while moving in a particular direction, than is being expelled, the quantity of returning fluid may at times be less than that being delivered through delivery passage 152. To prevent cavitation and its consequent noise, it is necessary that this quantitative discrepancy be made up from the supply of fluid in tank 12. At the lower pump speeds the atmospheric pressure exerted on the fluid in tank 12 is adequate to cause flow from the tank 12 through the bleed orifice 182 into channel 169 and thence through passages 94 and 92 and kidney ports 72 and 74 into the suction zones 64.

Should the pressure in passage 152 rise to an excessive value as determined by spring 121, the relief valve 120 will open, permitting the flow of fluid from passage 152 past the valve seat 118 into the spring chamber 115 of the relief valve. As previously mentioned, the relief valve spring chamber is in communication with bore 104 and a sufficient quantity of fluid will thus be diverted from delivery passage 152 to keep the operating pressure within safe limits. Since the pumping unit is of sufficient size to satisfactorily operate steering booster 192 while the vehicle engine is running at idling speed, a quantity of fluid will be supplied at higher speeds which is greatly in excess of actual requirements. As previously mentioned, valve 142 normally closes that portion of the bore 134 extending between pressure chamber 68 and bore 104 but becomes operative upon sufficient pressure drop existing across the orifice 155 to shift to the left and thus place pressure chamber 68 in communication with bore 104. As the delivery rate of the pumping unit increases, therefore, a continually increasing amount of fluid will be by-passed from pressure chamber 68 to bore 104. Also, as the speed, and consequently the delivery rate, of the pumping unit increases, it becomes desirable that replenishing fluid be positively introduced to the pump return passages leading to the suction zones 64 to prevent cavitation noises since, as previously noted, replenishing in the manner described for low speed operation is inadequate at higher speeds.

The requisite high speed replenishing is obtained by the use of the fluid by-passed from pressure chamber 68 to bore 104 in the following manner. Due to the constricted portion 108 in the bore 104, the by-passed fluid attains a relatively high velocity. In accordance with Bernoulli's equation the high velocity of the oil being by-passed through the restricted portion 108 is accompanied by a relatively low static pressure. As previously noted, the spring chamber of the relief valve 120 is in communication with the fluid in the tank 12 through passage 158. Fluid necessary to replace leakage losses will thus be added to the working fluid at the intersection of the spring chamber 115 and the constricted portion 108 of the bore 104 which is schematically indicated by passage 208 of Figure 9. As this high velocity oil passes from the constricted portion 108 into the relatively larger areas of the balance of the passages leading to the suction zones 64, a part of the kinetic energy which it possesses is converted to static pressure which is effective to maintain the passages leading to suction zones 64 full of fluid and so prevent cavitation. Replenishing fluid from tank 12 is thus positively impelled into the return passages.

It is also desirable that a certain portion of the fluid being circulated by the pumping mechanism pass through the tank 12 for cooling and the removal of entrained air therefrom. Flow into tank 12 from channel 169, of the fluid to be cooled and deaerated, is induced through the passage 182 by the static head derived from the converted kinetic energy of the by-passed fluid. The fluid so withdrawn from the system is replaced by fresh fluid from the tank 12 passing through the passage 158, valve spring chamber 115 and bore 104 in the same manner as the leakage replenishing fluid, thus establishing a bleed loop.

Bleed hole 182 from the reservoir 12 into the channel 169 maintains constant communication between the pump return passage and the reservoir. The role bleed hole 182 plays in the circuit, however, is a changing one dependent on the speed at which pump 10 is driven. At slow pump speeds the rate of flow in channel 169 will be small and the size of hole 182 will be large relative to this rate of flow. In fact, the pressures on opposite sides of the hole 182, that is, pressure in tank 12 and the pressure in channel 169, are so nearly equal that the effect is as though channel 169 were, in fact, the reservoir. For practical purposes then, open circuit operation results at low pump speeds. Desirable characteristics of the open circuit, including automatic replenishment of leakage, interchange of fluid between the reservoir and the working fluid and complete filling of the system by the mere addition of fluid to the reservoir have thus been retained. As the pump's speed increases to the point where cavitation normally becomes a problem, flow in channel 169 has increased to such a degree that the size of hole 182 relative to the rate of flow in channel 169 is small, and closed circuit operation results. At this time valve 142 has become operative to permit fluid to pass from pressure chamber 68 into the restricted portion 108 of the bore 104, thus increasing the pressure on suction zones 64 and producing circulation through the bleed loop as previously discussed.

There is thus provided a compact, efficient, and low cost power pack unit particularly well adapted for use with a variable speed prime mover. Output to any driven device is maintained at a relatively constant rate by the use of a by-pass circuit controlled by a valve responsive to flow in the pump delivery line.

Advantages of open circuit operation at low speeds have been retained and cavitation is prevented by increasing the pump inlet pressure at higher speeds. This increase is achieved by utilization of the flow in the by-pass circuit. Since the by-pass circuit becomes operative only at the higher pump speeds, it can be seen that a system has been provided which makes a timely change from effectively open circuit operation to closed circuit operation without the use of any special valve or other special moving part. Further, during closed circuit operation, circulation of a portion of the working fluid into the reservoir is maintained and its replacement by fresh fluid from the reservoir has been provided.

While the form of embodiment of the invention as herein disclosed constitutes a preferred form, it is to be understood that other forms might be adopted, all coming within the scope of the claims which follow.

What is claimed is as follows:

1. The combination of: a tank; a pump having a high pressure zone and a low pressure zone; means forming a fluid delivery passage extending from said high pressure zone; means forming a by-pass passage between said high pressure zone and said low pressure zone, said by-pass passage having therein a constricted portion upstream from a relatively larger portion leading to said low pressure zone; valve means responsive to flow in said fluid delivery passage for controlling flow in said by-pass passage; and a bleed loop through said tank comprising means forming a fluid passage from the relatively larger portion of said by-pass passage to said tank and means forming a fluid passage from said tank to the constricted portion of said by-pass passage.

2. The combination of: a pump comprising a housing, a pumping chamber therein, and rotary pumping mechanism in said chamber; external fluid delivery and return ports in said housing; means forming a fluid delivery passage in said housing leading from said pumping chamber to said delivery port; and a reentrant return passage comprising means in said housing located completely to one side of said pumping chamber forming a first fluid passage leading from said return port to an outlet in the exterior of said housing, means in said housing located completely on the axially opposite side of said pumping chamber from said first fluid passage, forming a second fluid passage having an inlet in the exterior of said housing and leading to said pumping chamber, and means forming a third fluid passage external of said housing and interconnecting the outlet of said first fluid passage and the inlet of said second fluid passage.

3. The combination of: a pump comprising a housing, a pumping chamber therein; pumping mechanism in that chamber, and external fluid delivery and return ports in said housing; means forming a fluid delivery passage in said housing leading from said pumping chamber to said delivery port; and a reentrant return passage comprising means in said housing forming a first fluid passage leading from said return port to an outlet in the exterior of said housing, means in said housing forming a second fluid passage having an inlet in the exterior of said housing and leading to said pumping chamber, and means forming a third fluid passage external of said housing and interconnecting the outlet of said first fluid passage and the inlet of said second fluid passage; means in said housing forming a by-pass passage between said pumping chamber and said first fluid passage; and valve means responsive to flow in said delivery passage for controlling flow in said by-pass passage.

4. The combination of: a tank; a pump comprising a housing, a pumping chamber therein, pumping mechanism in said chamber, and external fluid delivery and return ports in said housing; means forming a fluid delivery passage in said housing leading from said pumping chamber to said delivery port; a reentrant return passage comprising means in said housing forming a first fluid passage leading from said return port to an outlet in the exterior of said housing, means in said housing forming a second fluid passage having an inlet in the exterior of said housing and leading to said pumping chamber, and means forming a third fluid passage external of said housing and interconnecting the outlet of said first fluid passage and the inlet of said second fluid passage; means in said housing forming a by-pass passage between said pumping chamber and said first fluid passage, said by-pass passage being constricted, at least in part, relative to said reentrant return passage; means forming a fluid passage from said tank to the constricted portion of said by-pass passage; and valve means responsive to flow in said delivery passage for controlling flow in said by-pass passage.

5. The combination of: a tank; a pump comprising a housing, a pumping chamber therein, pumping mechanism in said chamber, and external fluid delivery and return ports in said housing; means forming a fluid delivery passage in said housing leading from said pumping chamber to said delivery port; and a reentrant return passage comprising means in said housing forming a first fluid passage leading from said return port to an outlet in the exterior of said housing, means in said housing forming a second fluid passage having an inlet in the exterior of said housing and leading to said pumping chamber, and means forming a third fluid passage external of said housing and interconnecting the outlet of said first fluid passage and the inlet of said second fluid passage, said last mentioned means including a wall portion which separates said third fluid passage from the interior of said tank.

6. The combination of: a tank; a pump comprising a housing, a pumping chamber therein, pumping mechanism in said chamber, and external fluid delivery and return ports in said housing; means forming a fluid delivery passage in said housing leading from said pumping chamber to said delivery port; a reentrant return passage comprising means in said housing forming a first fluid passage leading from said return port to an outlet in the exterior of said housing, means in said housing forming a second fluid passage having an inlet in the exterior of said housing and leading to said pumping chamber, and means forming a third fluid passage external of said housing and interconnecting the outlet of said first fluid passage and the inlet of said second fluid passage, said last mentioned means including a wall portion which separates said third fluid passage from the interior of said tank; and an orifice in said wall portion whereby fluid communication is established between said third fluid passage and the interior of said tank.

7. The combination of: a tank; a pump comprising a housing, a pumping chamber therein, pumping mechanism in said chamber, and external fluid delivery and return ports in said housing; means forming a fluid delivery passage in said housing leading from said pumping chamber to said delivery port; a reentrant return passage comprising means in said housing forming a first fluid passage leading from said return port to an outlet in the exterior of said housing, means in said housing forming a second fluid passage having an inlet in the exterior of said housing and leading to said pumping chamber, and means forming a third fluid passage external of said housing and interconnecting the outlet of said first fluid passage and the inlet of said second fluid passage, said last mentioned means including a wall portion which separates said third fluid passage from the interior of said tank; means in said housing forming a by-pass passage between said pumping chamber and said first fluid passage, said by-pass passage being constricted, at least in part, relative to said reentrant return passage; means forming a fluid passage from said tank to the constricted portion of said by-pass passage; valve means responsive to flow in said delivery passage for controlling flow in said by-pass passage; and an orifice in said wall portion whereby fluid communication is established between said third fluid passage and the interior of said tank.

8. A fluid pressure supply unit for supplying a hydraulic power system with a substantially fixed rate of flow when driven at any speed over a wide range comprising a reservoir, a fixed displacement pump, suction and delivery passages for the pump, a metering throat in the delivery passage, automatic valve means responsive to the velocity of the fluid in the throat for causing a diversion of part of the pump delivery fluid to the suction passage, inlet and outlet terminal connections for the unit, said throat leading to the outlet terminal, a return duct leading to the pump suction passage, two separate passages permanently open between the reservoir and two spaced points in the return duct, one passage serving to maintain open circuit conditions while pump delivery is low and the other passage acting in response to higher delivery from the pump to supercharge the return duct and maintain closed circuit conditions with the one passage providing a circulation bleed to the reservoir.

9. A fluid pressure supply unit for supplying a hydraulic power system with a substantially fixed rate of flow when driven at any speed over a wide range comprising a reservoir, a fixed displacement pump, suction and delivery passages for the pump, a metering throat in the delivery passage, automatic valve means responsive to the velocity of the fluid in the throat for causing a diversion of part of the pump delivery fluid to the suction passage, inlet and outlet terminal connections for the unit, said throat leading to the outlet terminal, a return duct having branches from the inlet terminal and from the automatic valve means leading to the pump suction passage, two separate passages permanently open between the reservoir and two spaced points in the return duct, one passage connecting with the return duct near the pump suction passage and serving to maintain open circuit conditions while the pump delivery is low and the other passage connecting with the return duct upstream from the first passage and acting in response to higher delivery from the pump to supercharge the return duct and maintain closed circuit conditions with the one passage providing a circulation bleed to the reservoir.

10. A fluid pressure supply unit for supplying a hydraulic power system with a substantially fixed rate of flow when driven at any speed over a wide range comprising a reservoir, a fixed displacement pump, suction and delivery passages for the pump, a metering throat in the delivery passage, automatic valve means responsive to the velocity of the fluid in the throat for causing a diversion of part of the pump delivery fluid to the suction passage, inlet and outlet terminal connections for the unit, said throat leading to the outlet terminal, a return duct having branches from the inlet terminal and from the automatic valve means leading to the pump suction passage, two separate passages permanently open between the reservoir and two spaced points in the return duct, one passage connecting with the return duct near the pump suction passage and serving to maintain open circuit conditions while the pump delivery is low and the other passage connecting with the valve branch of the return duct and acting in response to higher delivery from the pump to supercharge the return duct and maintain closed circuit conditions with the one passage providing a circulation bleed to the reservoir.

11. A fluid pressure supply unit for supplying a hydraulic power system with a substantially fixed rate of flow when driven at any speed over a wide range comprising a reservoir, a fixed displacement pump, suction and delivery passages for the pump, automatic valve means for diverting from the delivery passage to the suction passage that part of the fluid delivered by the pump in excess of a predetermined rate, a return duct leading to the pump suction passage, means responsive to the flow of fluid diverted by said valve means for supercharging the return duct with fluid from the reservoir, and a passage between the reservoir and the return duct providing leakage makeup at low delivery rates and providing a circulation bleed to the reservoir when the return duct is supercharged.

12. The combination of: a tank; a pump having a high pressure zone and a low pressure zone; two external connection ports on said pump, one delivery and one return, for connection to a fluid pressure operated device; means forming a fluid delivery passage extending from the high pressure zone to the delivery port; means forming a substantially closed pump intake passage extending from the return port to the low pressure zone; means forming a bypass passage between the high pressure zone and the low pressure zone, said bypass passage including part of said pump intake passage and having a constricted portion ahead of the pump intake passage; valve means responsive to flow in the delivery passage for controlling flow in the bypass passage; and means forming a fluid passage from the tank to the constricted portion of said bypass passage, whereby the low pressure zone can be supercharged by the velocity effect occurring in the constricted portion.

13. The combination of: a tank; a pump having a high pressure zone and a low pressure zone; two external connection ports on said pump, one delivery and one return, for connection to a fluid pressure operated device; means forming a fluid delivery passage extending from the high pressure zone to the delivery port; means forming a substantially closed pump intake passage extending from the return port to the low pressure zone; means forming a bypass passage between the high pressure zone and the low pressure zone, said bypass passage including part of said pump intake passage and having a constricted portion ahead of the pump intake passage; valve means responsive to flow in the delivery passage from controlling flow in the bypass passage; means forming a constricted fluid passage from the intake passage to the tank; and means forming a fluid passage from the tank to the constricted portion of said bypass passage, whereby the low pressure zone can be supercharged by the velocity effect occurring in the constricted portion.

References Cited in the file of this patent

UNITED STATES PATENTS

| | | |
|---|---|---|
| 186,172 | Sellers | Jan. 9, 1877 |
| 1,029,409 | Wittemann | June 11, 1912 |
| 1,350,095 | Eddison | Aug. 17, 1920 |
| 2,214,817 | Harrington | Sept. 17, 1940 |
| 2,219,488 | Parker | Oct. 29, 1940 |
| 2,251,664 | Davis | Aug. 5, 1941 |
| 2,280,392 | Herman et al. | Apr. 21, 1942 |
| 2,316,445 | Marshall | Apr. 13, 1943 |
| 2,380,656 | Lauer et al. | July 31, 1945 |
| 2,433,220 | Huber | Dec. 23, 1947 |
| 2,456,651 | Schmiel | Dec. 21, 1948 |
| 2,510,150 | Stephens | June 6, 1950 |

FOREIGN PATENTS

| | | |
|---|---|---|
| 418,773 | Italy | Mar. 5, 1947 |
| 559,108 | Great Britain | Feb. 4, 1944 |